United States Patent [19]

Kawamoto et al.

[11] Patent Number: 5,064,785
[45] Date of Patent: Nov. 12, 1991

[54] ALKALI-RESISTANT GLASS FOR FORMING GLASS FIBERS

[75] Inventors: Toru Kawamoto, Shiga; Shigeru Yamamoto, Kyoto, both of Japan

[73] Assignee: Nippon Electric Glass Co., Ltd., Otsu, Japan

[21] Appl. No.: 568,463

[22] Filed: Aug. 16, 1990

[30] Foreign Application Priority Data

Aug. 23, 1989 [JP] Japan .................................. 1-216822

[51] Int. Cl.$^5$ ...................... C03C 3/078; C03C 13/00; C03C 3/085; C03C 3/087
[52] U.S. Cl. ........................................ 501/72; 501/35; 501/38; 501/69; 501/70
[58] Field of Search ...................... 501/38, 35, 55, 68, 501/69, 70, 72

[56] References Cited

U.S. PATENT DOCUMENTS

| | | | |
|---|---|---|---|
| 3,969,121 | 7/1976 | Atkinson | 501/38 |
| 4,142,906 | 3/1979 | Iizawa | 501/38 |
| 4,243,421 | 1/1981 | Kume | 501/88 |
| 4,345,637 | 8/1982 | Fyles et al. | 501/38 |

Primary Examiner—Mark L. Bell
Attorney, Agent, or Firm—Collard, Roe & Galgano

[57] ABSTRACT

An alkali-resistant glass for forming glass fibers having the composition: 54 to 65 wt. % $SiO_2$, 18 to 25 wt. % $ZrO_2$, 0 to 5 wt. % $Li_2O$, 10 to 7 wt. % $Na_2O$, 0.5 to 8 wt. % $K_2O$, 0 to 10 wt. % RO where R represents Mg, Ca, Sr, Ba, or Zn, 0.5 to 7 wt. % $TiO_2$, and 0 to 2 wt. % $Al_2O_3$, which glass composition is free or substantially free from $F_2$.

1 Claim, No Drawings

ALKALI-RESISTANT GLASS FOR FORMING GLASS FIBERS

BACKGROUND OF THE INVENTION

1) Field of the Invention

The present invention relates to an alkaliresistant glass for forming glass fibers used to reinforce cementitious products, and more particularly to an alkaliresistant glass with a low devitrification temperature and superior fiberizing characteristics for forming glass fibers.

2) Description of the Prior Art

Glass fibers have not only so large a strength but also so high a modulus of elasticity that they are widely used to reinforce cementitious products. However cement is highly alkaline. Therefore, when glass fibers are mixed into cement the glass fibers are gradually attacked by the cement and break down so that their reinforcing effect is drastically reduced and the strength of the product itself is also lessened. For this reason there is a strong need for an alkali-resistant glass fiber for such an application.

Conventionally, it is known that the addition of $ZrO_2$ to glass is effective in improving the resistance of glass to alkali. As the amount of $ZrO_2$ in the glass composition is increased, the alkali resistance of the glass fiber obtained from such a composition also increases. However, as the $ZrO_2$ content is increased, the fiberizing characteristics of the glass drastically deteriorate. Specifically, as the $ZrO_2$ content is increased, the viscosity of the glass also increases, and the fiberizing temperature of the glass (the temperature at which the viscosity of the glass reaches $10^3$ poise - hereinafter referred to as $T_F$) rises so that severe damage occurs to the platinum bushing used in fiberizing. In addition, in company with an increase in the $ZrO_2$ content, the devitrification temperature of the glass (the temperature at which crystals first appear when molten glass is slowly cooled - hereinafter referred to as $T_L$) rises, and there is a tendency for devitrification to occur in the liquid glass during melting and fiberizing. For this reason, a devitrified material becomes mixed into the liquid glass during fiberizing so that breaks in the fiber occur and fiberizing becomes very difficult. Accordingly, conventionally proposed alkali-resistant glass fibers containing $ZrO_2$ are restricted to a relatively low $ZrO_2$ content, or attempts are made to improve the fiberizing characteristics by mixing in other components.

For example, Japanese Laid Patent Publication Nos. 53-18042 and 57-16939 disclose glass compositions with relatively low $ZrO_2$ contents of less than 11 wt. % and less than 15 wt. % respectively. However, as previously outlined, because the resistance of glass to alkali and the $ZrO_2$ content of the glass are interdependent, when the $ZrO_2$ content is held to a low value the alkali resistance of the glass is insufficient for use in practice.

In addition, a composition wherein other components are mixed into the glass in addition to an increase in the $ZrO_2$ content is disclosed in Japanese Patent Publication No. 60-54248 in which CaO and BaO are blended into the mixture to control devitrification. However, an example disclosed in this patent is seen to have a $T_F$ of 1300° C. or higher, which is high enough to cause concern about the possible deterioration of the platinum bushing or about difficulties in fiberizing the glass because the difference between the $T_L$ and the $T_F$, on which the fiberizing characteristics are based, is 100° C. or less. Specifically, the results of experiments conducted by the inventors of the present invention have indicated that it is preferable that the $T_F$ be lower than 1300° C. to prevent deterioration of the platinum bushing. In addition, even if the $T_F$ is set at a temperature which the platinum bushing can withstand, in the immediate vicinity of the molten glass, for example, part of the molten glass halfway through a feeder which conducts it to the platinum bushing from the melting furnace drops to a temperature considerably lower than the $T_F$. Accordingly, if the $T_L$ is not considerably lower than the $T_F$, devitrification occurs causing fiber breakage. For this reason, it will be essential that $T_F-T_L$ be 150° C. or greater for a stable industrial fiberizing operation.

Examples for which $T_F-T_L$ is 150° C. or greater are described in Japanese Patent Publication No. 49-40126, but all the examples which satisfy this condition have a $ZrO_2$ content of less than 18 wt. %. Therefore the alkali resistance of the glass is unsatisfactory.

The addition of rare earth metal oxides such as $CeO_2$ and $La_2O_3$ to the glass is not effective for improvement of the quality of the glass for forming glass fiber because such rare earth metal oxides devitrify the glass and are costly.

Summary of the Invention

It is therefore an object of the present invention to provide, with due consideration to the drawbacks of such conventional alkali-resistant glasses for forming glass fiber, (i) a glass for forming glass fibers with superior alkali resisting characteristics, a low devitrification temperature ($T_L$), and superior fiberizing characteristics and (ii) a fibrous glass prepared from the alkali-resistant glass.

The object of the present invention is achieved by an alkali-resistant glass comprising 54 to 65 wt. % $SiO_2$, 18 to 25 wt. % $ZrO_2$, 0 to 5 wt. % $Li_2O$, 10 to 17 wt. % $Na_2O$, 0.5 to 8 wt. % $K_2O$, 0 to 10 wt. % RO where R represents Mg, Ca, Sr, Ba, or Zn, 0.5 to 7 wt. % $TiO_2$, and 0 to 2 wt. % $Al_2O_3$, which glass is free or substantially free from F.

It is preferable that the alkali-resistant glass comprise 57 to 64 wt. % $SiO_2$, 19 to 24 wt. % $ZrO_2$, 0.5 to 2.5 wt. % $Li_2O$, 11 to 15 wt. % $Na_2O$, 1 to 5 wt. % $K_2O$, 0.2 to 8 wt. % RO where R represents Mg, Ca, Sr, Ba, or Zn, 0.5 to 5 wt. % $TiO_2$, and 0 to 1 wt. % $Al_2O_3$, with no or substantially no $F_2$, and that the difference between the fiberizing temperature ($T_F$) and the devitrification temperature ($T_L$), that is, $T_F-T_L$ of the glass be 150° C. or greater for a stable industrial fiberizing operation.

Description of the Preferred Embodiments

The inventors of the present invention have discovered as the result of repeated investigations aimed at obtaining an alkali-resistant glass with a high $ZrO_2$ content and good fiberizing characteristics that the $T_L$ can be drastically reduced and the fiberizing characteristics improved if $TiO_2$ is added to a glass composition with a high $ZrO_2$ content.

The glass according to the present invention exhibits good fiberizing characteristics because, even though the $ZrO_2$ content is 18 wt. % or over, the $T_F$ is 1300° C. or less and the value of $T_F-T_L$ is 150° C. or greater.

The reasons why the alkali-resistant glass of the present invention has both a low $T_F$ and $T_L$, and good fiberizing characteristics, even though the $ZrO_2$ content is high, are as follows.

Generally, when the $ZrO_2$ content is increased to improve the alkali-resistant characteristics of a glass, in addition to an increase in the $T_F$, the $T_L$ also increases causing a tendency toward devitrification of baddeleyite ($ZrO_2$). Increasing the $Na_2O$ content effectively lowers the $T_F$, but such an increase also causes a tendency toward devitrification of keldyshite ($Na_2O.ZrO_2.2SiO_2$), and an increase in the $T_L$. However, when $TiO_2$ is added, the devitrification of both the $ZrO_2$ and the keldyshite can be suppressed without any increase in the $T_F$, and the $T_L$ can be lowered by a large amount. Furthermore, by the addition of other alkali oxides such as $Li_2O$ and $K_2O$, in addition to $Na_2O$, the effect in lowering the $T_L$ can be remarkably obtained.

In the present invention, the large drop in the $T_L$ obtained in this manner makes it possible to add alkaline earth compounds such as CaO and MgO which tend to increase the $T_L$, and as a result, an improvement in the water resistance of the glass can be obtained. Increasing the water resistance of the glass is beneficial in the manufacture of the glass fiber. Specifically, an aqueous solution of a sizing agent is applied to the glass fiber during the fiberizing operation, but if this glass has poor water resistance, deterioration of the glass fiber is produced by this sizing agent solution, and there are restrictions on the use of a sizing agent. However, if the water resistance of the glass is improved by the addition of an alkali earth compound, a superior glass fiber can be provided because the sizing agent can then be freely selected.

The reasons for the restriction in the ranges in which the various components can be used in the present invention are as follows.

$SiO_2$ is the component which forms the basic structure of the glass, which is employed in the range of 54 wt. % to 65 wt. %. If less than 54 wt. % is added, the water resistance of the glass deteriorates; if more than 65%, the glass is difficult to melt and devitrification of cristobalite ($SiO_2$) which accompanies the increase in the $T_F$ tends to occur. A preferable amount is in the range of 57 wt. % to 64 wt. %.

$ZrO_2$ is the component which imparts alkali resistance to the glass, which is employed in the range of 18 wt. % to 25 wt. %. This effect is reduced when less than 18 wt. % is added, and, if the added amount exceeds 25 wt. % the resulting increase in the $T_F$ causes devitrification of the baddeleyite. A preferable amount is in the range of 19 wt. % to 24 wt. %.

$Li_2O$ is used as a flux in an amount ranging from 0 to 5 wt. %, which, in addition to promoting the melting of the glass, lowers the $T_F$. However, the raw material for $Li_2O$ is high priced, so if 5 wt. % addition is exceeded the cost of the product is increased, which is undesirable.

$Na_2O$ is also used as a flux in an amount ranging from 10 wt. % to 17 wt. %, which, in addition to promoting the melting of the glass, lowers the $T_F$. However, this component is ineffective below 10 wt. %, and above 17% devitrification of keldyshite tends to occur, which is undesirable.

$K_2O$ is also used as a flux in an amount of 0.5 wt. % to 8 wt. %, which, in addition to promoting the melting of the glass, lowers the $T_F$. However, this component is ineffective below 0.5 wt. %, and above 8% the $T_L$ is increased.

The $T_L$ can be lowered by combining $Li_2O$, $Na_2O$, and $K_2O$. The preferable ranges for these alkali metal oxides are: 0.5 to 3 wt. % $Li_2O$; 11 to 15 wt. % $Na_2O$; and 1 to 5 wt. % $K_2O$.

$TiO_2$ is an indispensable component for lowering the $T_L$, which is used in the range of 0.5 wt. % to 7 wt. %. This component is ineffective below 0.5 wt. % and above 7 wt. % the melting of the glass becomes difficult. A preferable amount is in the range of 0.5 to 5 wt. %.

Addition of rare earth metal oxides improves the water resistance of the glass, but the $T_L$ is elevated by the addition of amounts exceeding 10 wt. %. Preferably, the addition ratio should 8 wt. % or less. Because there is a tendency toward devitrification of the baddeleyite, it is preferable that $Al_2O_3$ be added at 2 wt. % or less, and, more preferably, 1 wt. % or less.

Evaporation of $F_2$ during the melting of the glass causes damage to the environment. $F_2$ is therefore undesirable as a component.

The present invention will now be explained in detail with reference to the following examples, which are given for illustration of the invention and are not intended to be limiting thereof.

EXAMPLE 1

A mixture of the following components was placed in a platinum crucible and melted at 1550° C. for 4 hours:

|  | wt. % |
|---|---|
| $SiO_2$ | 60.7 |
| $ZrO_2$ | 20.5 |
| $Li_2O$ | 1.5 |
| $Na_2O$ | 12.4 |
| $K_2O$ | 2.4 |
| MgO | 0.5 |
| $TiO_2$ | 2.0 |

After melting, the molten material was poured onto a carbon plate and annealed, whereby glass samples for the following measurements were prepared.

The viscosity of the glass was measured by a platinum-ball-pulling-up method.

The fiberizing temperature $T_F$ of the glass corresponds to the temperature at which the melt viscosity of the glass reached $10^3$ poise.

The devitrification temperature $T_L$ of the glass was measured by preparing from the glass a glass powder of a 297 to 500 μm particle size, placing this powder in a platinum boat, holding for 16 hours in an electric furnace with a temperature gradient, then air cooling and determining the location of any devitrification under a microscope.

The alkali resistance was determined by placing a glass powder of a 297 to 500 μm particle size in a 10 wt. % aqueous solution of NaOH at 80° C. and holding for 16 hours, after which the percent weight loss was measured.

The water resistance was determined by measuring the amount of alkali extracted in water from the glass, on the basis of Japanese Industrial Standards (JIS) R 3502. The results of the above tests are shown in TABLE.

EXAMPLES 2 TO 7 TO COMPARATIVE EXAMPLES 1 AND 2

The procedure for Example 1 was repeated except that the formulation of the glass sample in Example 1 was replaced as shown in the TABLE, and the same tests as in Example 1 were conducted. The results are shown in the TABLE.

TABLE

| No. | Examples | | | | | | | Comparative Examples | |
|---|---|---|---|---|---|---|---|---|---|
| | 1 | 2 | 3 | 4 | 5 | 6 | 7 | 1 | 2 |
| Composition | | | | | | | | | |
| $SiO_2$ | 60.7 | 61.0 | 60.7 | 59.3 | 58.5 | 60.7 | 58.5 | 63.0 | 60.7 |
| $ZrO_2$ | 20.5 | 19.5 | 19.5 | 20.0 | 21.5 | 19.5 | 20.7 | 16.7 | 19.5 |
| $Li_2O$ | 1.5 | 1.5 | 1.0 | 1.2 | 2.0 | 1.2 | 2.0 | | 1.0 |
| $Na_2O$ | 12.4 | 12.3 | 13.9 | 12.0 | 11.5 | 12.7 | 11.8 | 14.9 | 16.4 |
| $K_2O$ | 2.4 | 2.6 | 2.4 | 2.0 | 2.0 | 2.4 | 3.0 | 0.2 | 2.4 |
| MgO | 0.5 | | | | | | | | |
| CaO | | 0.5 | 0.5 | 3.0 | | 0.5 | 0.5 | 5.2 | |
| SrO | | | | | | | | | |
| BaO | | | | | 2.0 | | | | |
| ZnO | | | | | | | | | |
| $TiO_2$ | 2.0 | 2.6 | 2.0 | 2.5 | 2.5 | 3.0 | 3.5 | | |
| $T_F$ (°C.) | 1278 | 1285 | 1289 | 1282 | 1275 | 1290 | 1272 | 1294 | 1280 |
| $T_L$ (°C.) | 1115 | 1121 | 1116 | 1105 | 1115 | 1095 | 1105 | 1200 | 1195 |
| $T_F$-$T_L$ (°C.) | 163 | 164 | 173 | 177 | 160 | 195 | 167 | 94 | 85 |
| Alkali Resistance (%) (10% NaOH, 80° C., 16 Hr) | 0.50 | 0.54 | 0.60 | 0.53 | 0.45 | 0.56 | 0.49 | 0.95 | 0.71 |
| Water Resistance (mg) (JIS R 3502) | 0.21 | 0.25 | 0.29 | 0.20 | 0.18 | 0.27 | 0.20 | 0.26 | 0.62 |

As can be clearly seen from the TABLE, Examples Nos. 1 to 7 of the present invention, all have a $T_F$ of less than 1300° C., and the $T_F$-$T_L$ in all the Examples is greater than 150° C., indicating .lgasses with superior fiberizing characteristics. Also, the weight loss in alkali was less than 0.6 wt. %, and the amount of alkali extracted in water, on the basis of JIS R 3502, was very small, specifically, less than 0.3 mg, indicating glasses with superior alkali resistance and water resistance.

On the other hand, Comparative Example No. 1, which contained only a small amount of $ZrO_2$, had a large weight loss in alkali and reduced alkali resistance. Comparative Example No. 2, which contained a large amount of $ZrO_2$, showed superior alkali resistance, but, because the $T_L$ was high, $T_F$-$T_L$ was less than 150° C., indicating poor fiberizing characteristics. Also, the amount of alkali extracted in water, on the basis of JIS R 3502, was large, specifically, 0.62 mg, indicating glass with deteriorating water resistance.

As indicated in the foregoing explanation, the alkali-resistant glass of the present invention has superior alkali resistance because of its high $ZrO_2$ content. Therefore there is no concern about long-term deterioration of the glass fiber when used to reinforce cementitious products. In addition this composition showed good fiberizing characteristics because of its low $T_L$, so there is also no concern about fiber breakage from devitrification during fiberizing. It is therefore possible to supply inexpensive products at high productivity. This composition is hlghly suitable as a substitute for asbestos which is a noxious substance. In addition, the water resistance of the glass can be improved by the addition of alkali earth metal oxides, making it possible to apply various types of sizing agents so that an even greater improvement in performance can be expected. Furthermore, because the glass contains no $F_2$, there is no pollution of the environment during the manufacturing process.

What is claimed is:

1. An alkali-resistant glass for forming glass fibers, which comprises, by weight, 57 to 64% $SiO_2$, 19 to 24% $ZrO_2$, 0.5 to 3% $Li_2O$, 11 to 15% $Na_2O$, 1 to 5% $K_2O$, 0.2 to 8% RO, R being Mg, Ca Sr, Ba or Zn, 0.5 to 5% $TiO_2$, 0 to 1% $Al_2O_3$ and containing no $F_2$, the glass having a fiberizing temperature of 1300° C. or less and a devitrification temperature which is by at least 150° C. lower than the fiberizing temperature.

* * * * *